United States Patent
Sinha et al.

(10) Patent No.: US 12,529,886 B2
(45) Date of Patent: Jan. 20, 2026

(54) INTRAOCULAR LASER PROJECTION SYSTEM

(71) Applicant: Verily Life Sciences LLC, Dallas, TX (US)

(72) Inventors: Supriyo Sinha, Menlo Park, CA (US); Shungneng Lee, Sunnyvale, CA (US); Dimitri Azar, Chicago, IL (US)

(73) Assignee: Verily Life Sciences LLC, Dallas, TX (US)

( * ) Notice: Subject to any disclaimer, the term of this patent is extended or adjusted under 35 U.S.C. 154(b) by 524 days.

(21) Appl. No.: 18/070,368

(22) Filed: Nov. 28, 2022

(65) Prior Publication Data

US 2023/0168489 A1 Jun. 1, 2023

Related U.S. Application Data

(60) Provisional application No. 63/283,931, filed on Nov. 29, 2021.

(51) Int. Cl.
*G02B 26/08* (2006.01)
*A61F 2/16* (2006.01)
*H04N 9/31* (2006.01)

(52) U.S. Cl.
CPC ............ *G02B 26/08* (2013.01); *A61F 2/1613* (2013.01); *H04N 9/3173* (2013.01)

(58) Field of Classification Search
CPC ......... A61F 2/14; A61F 2/1613; H04N 9/312; H04N 9/3129; H04N 9/3135; H04N 9/3141; H04N 9/3161; H04N 9/3173; G02B 26/08; G02B 26/0833; G02B 26/101
See application file for complete search history.

(56) References Cited

U.S. PATENT DOCUMENTS

| | | | |
|---|---|---|---|
| 10,299,912 B2 | 5/2019 | Grant | |
| 10,467,992 B2 | 11/2019 | Deering et al. | |
| 11,376,163 B2 | 7/2022 | Yu et al. | |
| 11,874,462 B2 * | 1/2024 | Lee | A61F 2/14 |
| 2009/0189830 A1 | 7/2009 | Deering et al. | |
| 2011/0254503 A1 * | 10/2011 | Widmer | B60L 53/126 320/108 |
| 2015/0237316 A1 * | 8/2015 | Viswanathan | G02B 26/101 359/213.1 |

(Continued)

FOREIGN PATENT DOCUMENTS

| | | |
|---|---|---|
| WO | 2020231517 | 11/2020 |
| WO | 2020231518 | 11/2020 |
| WO | 2020231519 | 11/2020 |

OTHER PUBLICATIONS

Shim, Sarah Y., et al., "Feasability of Intraocular Projection for Treatment of Intractable Corneal Opacity," Cornea, vol. 38, No. 4, Apr. 2019, pp. 523-527.

(Continued)

*Primary Examiner* — Sultan Chowdhury
(74) *Attorney, Agent, or Firm* — Haynes and Boone, LLP

(57) ABSTRACT

An implant that is to be implanted inside the eye of a person contains a laser projection scanning subsystem that is configured to "paint" an image of the scene that is before the person, on the retina. The image of the scene may be acquired by a digital camera that is attached to a head unit that may be worn by the person, and then transmitted to the implant. Other aspects are also described and claimed.

20 Claims, 5 Drawing Sheets

(56) References Cited

U.S. PATENT DOCUMENTS

| | | | |
|---|---|---|---|
| 2017/0010473 A1* | 1/2017 | Ide | G02B 3/0056 |
| 2018/0143454 A1 | 5/2018 | Humphreys et al. | |
| 2019/0282399 A1* | 9/2019 | Goetz | A61B 8/54 |
| 2020/0237211 A1* | 7/2020 | Copland | A61B 3/102 |
| 2020/0345555 A1 | 11/2020 | Saini | |
| 2021/0290440 A1* | 9/2021 | Wiemer | A61B 5/076 |
| 2021/0294123 A1* | 9/2021 | Weeber | G02C 7/044 |
| 2022/0233357 A1 | 7/2022 | Saini | |

OTHER PUBLICATIONS

Hofmann, Ulrich, et al., "MEMS scanning laser projection based on high-Q vacuum packaged 2D-resonators," Proceedings of SPIE—The International Society for Optical Engineering, Feb. 2021, 11 pages.

International Search Report and Written Opinion received for PCT Patent Application No. PCT/US22/051097, mailed on Apr. 3, 2023, 9 pages.

Wang, J., "Design rules for dense and rapid Lissajous scanning", Microsystems & Nanoengineering, vol. 6, No. 1, 2020, pp. 1-7.

* cited by examiner

INTRAOCULAR LASER PROJECTION SYSTEM

This patent application claims the benefit of the earlier filing date of U.S. provisional application No. 63/283,931 filed 29 Nov. 2021.

An aspect of the disclosure here relates to technological solutions for reproducing an optical image of a scene that is before a person, on a retina of the person; the person may be vision impaired due to their cornea being diseased or injured. Other aspects are also described.

BACKGROUND

Disease or injury to the cornea of a person can lead to opacification or significant optical damage to the cornea, such that the individual is effectively rendered blind. Current solutions rely on eye banks for corneal transplants, and artificial corneas. Both however have issues with transplant rejection and surgical complications, and may also result in low visual acuity.

Blindness due to corneal disease or injury may occur despite the person having a fully functioning retina. For such persons, who have a functioning retina but otherwise are essentially blind due to vascularization or damage to the cornea, implantation of an intraocular micro-display into the lens of the eye (e.g., in the capsular sack region) can restore vision to the person. The intra-ocular micro-display receives an image of the scene before the person, the image having been captured by a head mounted camera, and then optically displays the entire image at once, onto the retina.

SUMMARY

One aspect of the disclosure here is an electronic system that has a laser scanning implant that is to be implanted inside the eye of a person. The implant contains a laser projection scanning subsystem that is configured to "paint" an image of the scene that is before the person, on the retina. The image of the scene may be acquired by a digital camera that is attached to a head unit that may be worn by the person, and then transmitted wirelessly (e.g., over the air) to the implant.

The implant may be small enough to fit inside the volume of a lens capsule. Alternatively, it could be placed at least partially inside the anterior chamber, or entirely within the vitreous chamber.

One or aspects of the system may yield several advantages. First, the use of a laser projection subsystem to form the image on the retina may relax some of the constraints on the placement of the implant relative to the retina, particularly as compared to an implanted, liquid crystal microdisplay. For example, with a laser spot size of 10 microns in diameter on the retina, the placement of the implant could be as loose as +/−0.2 millimeters for a green laser which might result in a less than 50% increase in the diameter of the laser spot. Moreover, the power efficiency of the laser projection subsystem may be better than that of an implanted microdisplay since all of the light that is generated by the laser is placed on the retina, as opposed to the microdisplay which loses much of its emitted light through polarizers.) In yet another aspect, if no lenses are needed after the scanning mirrors of the MEMS scanner as described below, then spherical aberrations are reduced.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
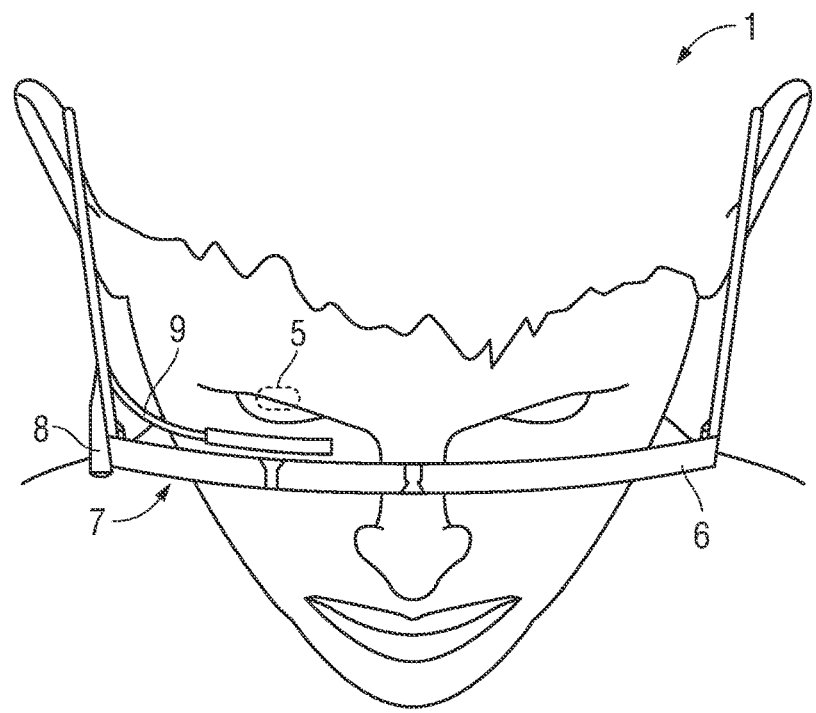
FIG. 1 is a plan view illustration of an example intraocular laser projection system including an implant and a head unit.
Figure 2:
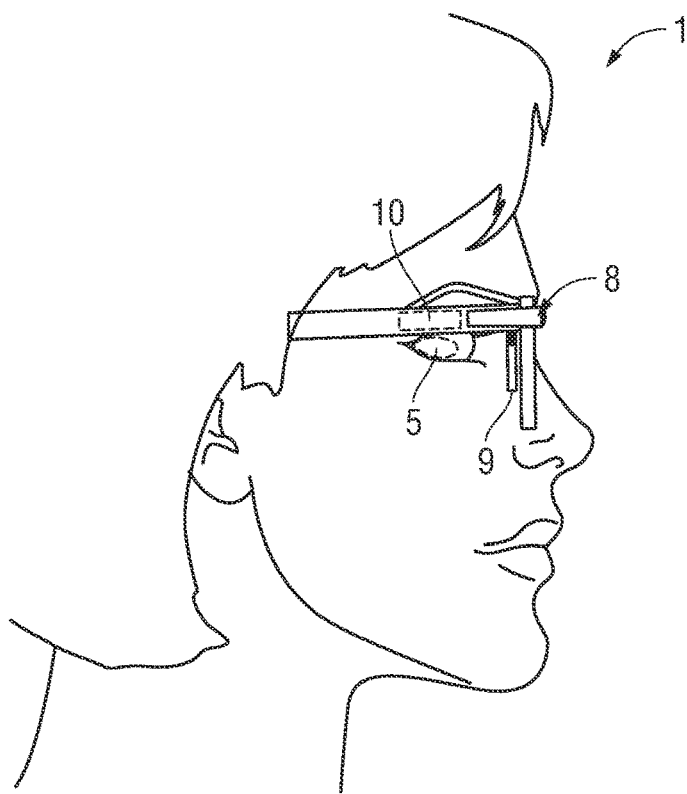
FIG. 2 is a side view illustration of the example system.
Figure 3:
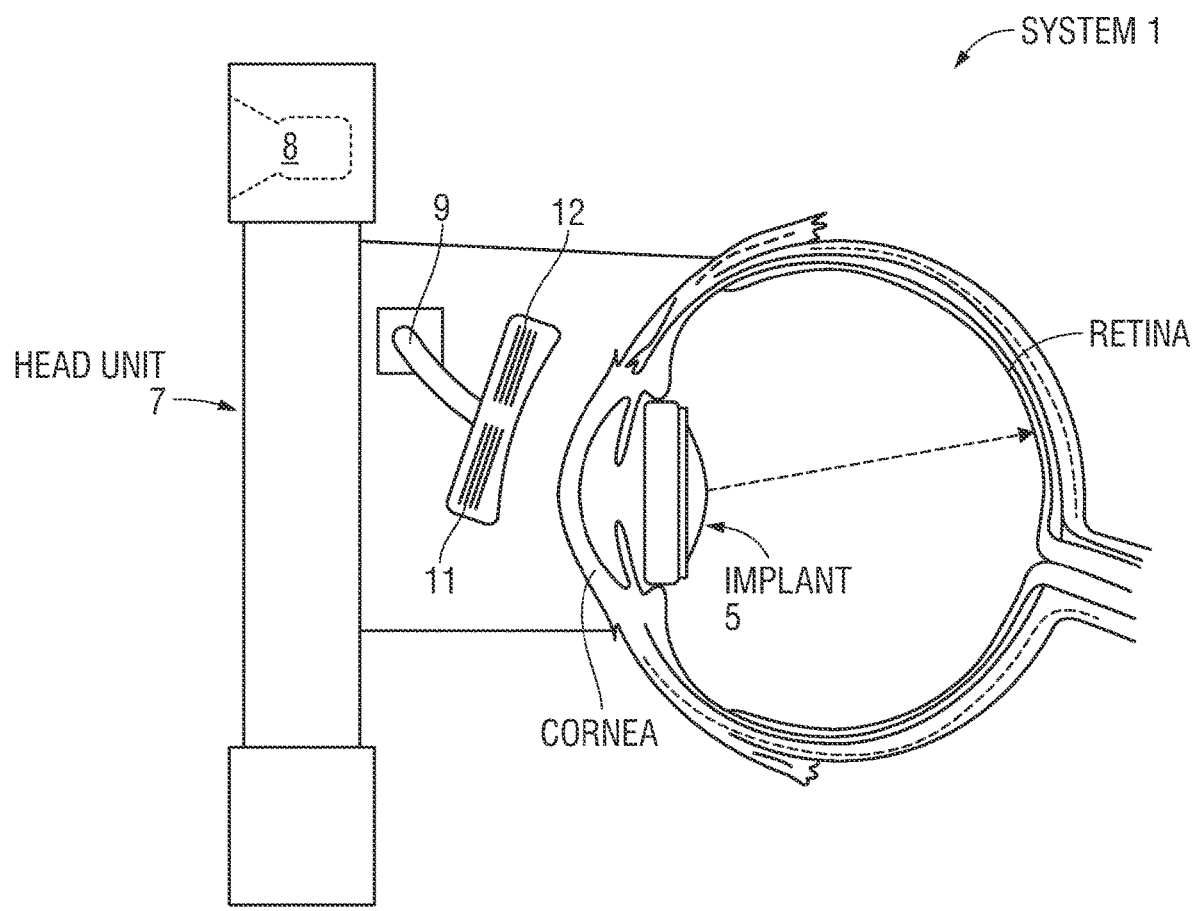
FIG. 3 is a cross-sectional illustration of the system showing the projection of images onto a retina.

Referring to FIG. 1, FIG. 2, and FIG. 3, these are illustrations of an example intraocular laser projection system 1, that has an implant 5 within an eye of a person, and a head unit 7 worn by the person. The head unit 7 may be for example eye glasses as shown in the figures, that contains a digital camera 8 and various electronics 10 as described in more detail below. The system 1 projects digital images of the scene that is before the person onto a retina of the person's eye as illustrated in FIG. 3.

Figure 4:
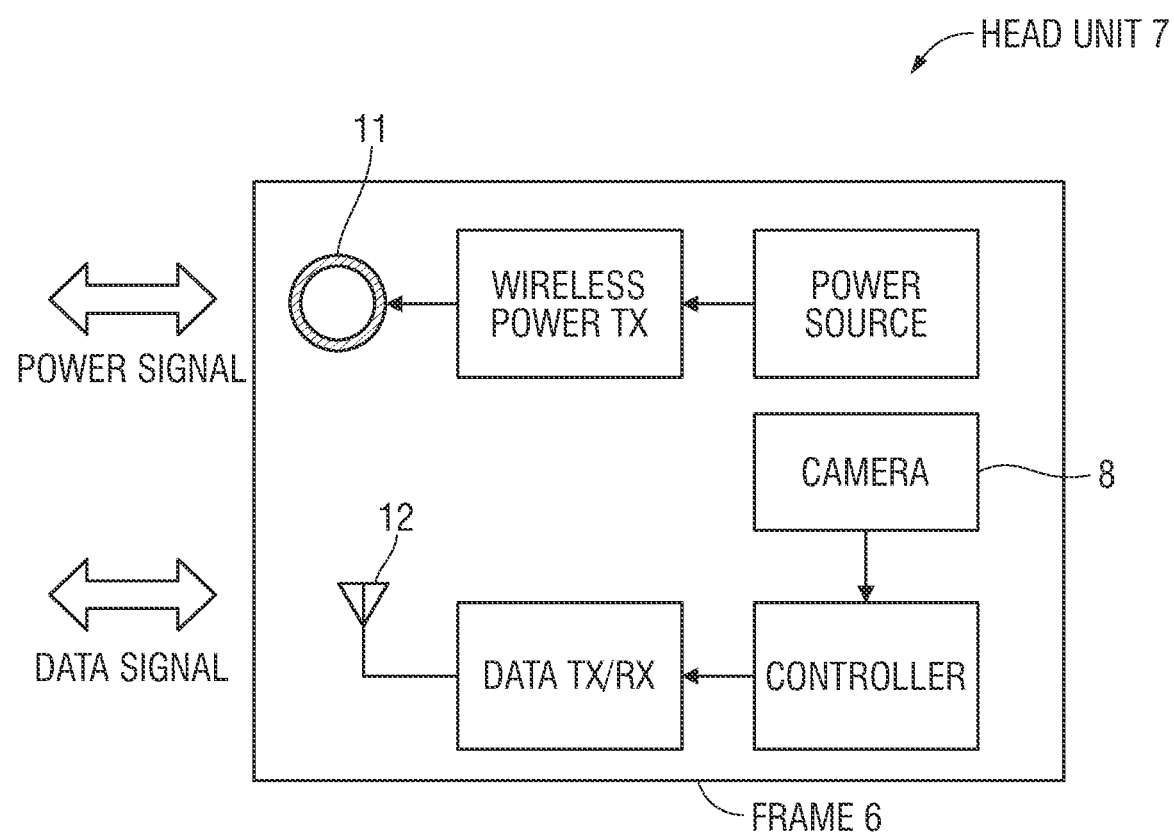
FIG. 4 is a block diagram of an example head unit.

FIG. 4 is a block diagram of an example head unit 7 in which the images are acquired by a (digital) camera 8. The camera 8 may be integrated into a frame 6 of the head unit 7, and may be pointed in a direction of a gaze of the person (wearer of the head unit 7) as shown in FIG. 2. Also integrated in the frame of the head unit is a data transmitter and receiver (data tx/rx.) The data tx/rx transmits the images to the implant 5, and may receive system configuration information from another device (not shown.) In one aspect, this is a wireless transmission/reception, e.g., radio frequency over-the-air, made by a data antenna 12. The data antenna 12 may also be integrated into the frame 6, for example by way of an antenna mount 9 to which it is attached (see FIG. 1 and FIG. 2.) The head unit 7 may also contain a digital controller that processes the images acquired by the camera 8 (before preparing or formatting them to be transmitted to the implant 5), for example to make the images more suitable for use by the laser projection subsystem in the implant 5. The frame 6 of the head unit 7 also contains a power source such as a rechargeable battery, that not only powers the electronics that is in the head unit 7 but enables the head unit 7 to supply power to operate the implant 5. In one instance, power to the implant is supplied wirelessly, via a wireless power transmitter (wireless power tx) that is mated to a power transmitting or charging antenna 11, in the head unit 7.

Figure 5:
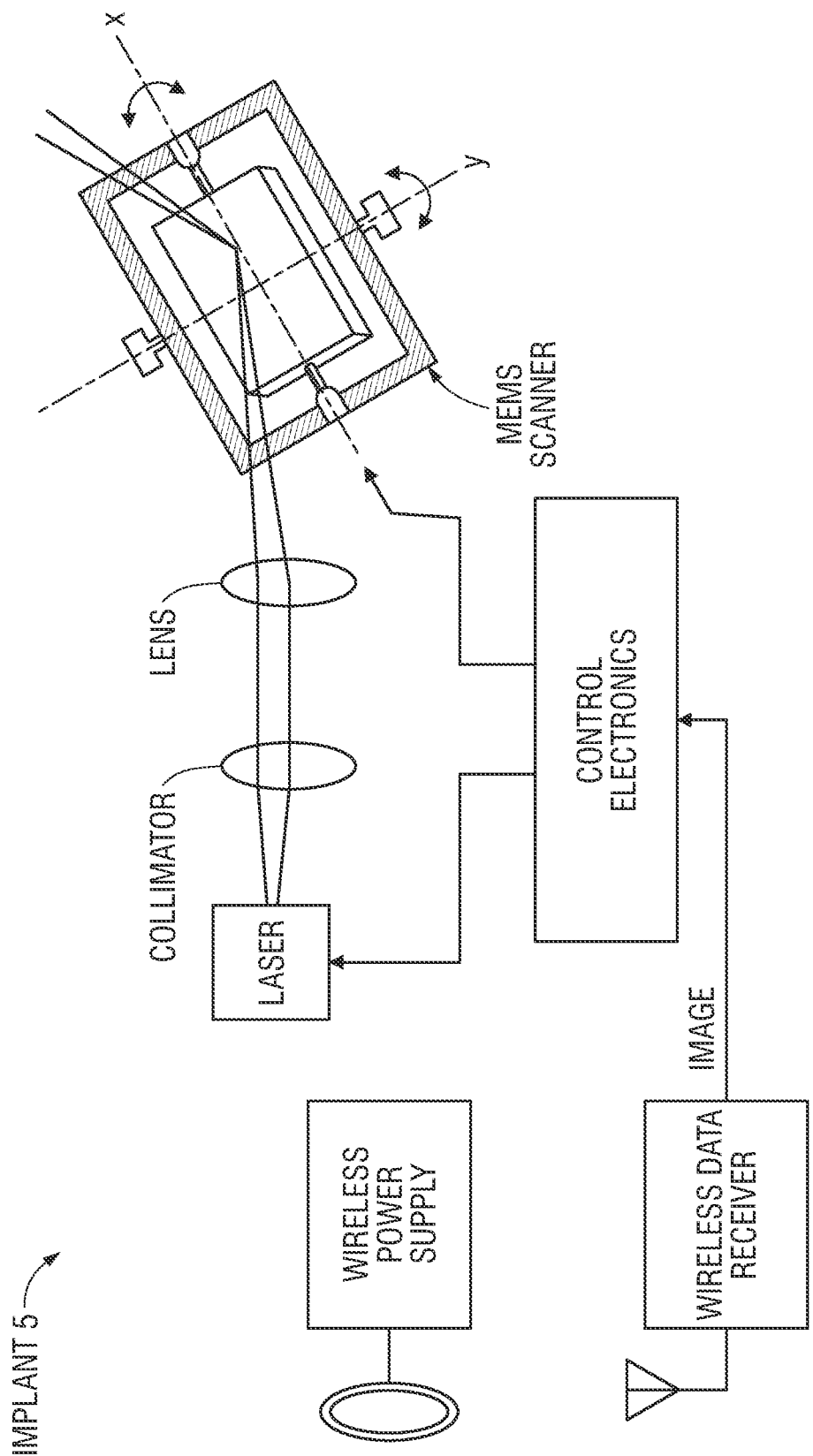
FIG. 5 is a block diagram of an example implant.

Turning now to FIG. 5, this is a block diagram of an example implant 5. The implant 5 contains a laser projection subsystem that includes a laser that produces a laser beam; a collimator that collimates the laser beam, e.g., reduces the spatial cross-section of the beam; a lens that focuses the laser beam into a laser spot on the retina (when the implant 5 is inside the eye); and a micro electro mechanical system, MEMS, scanner that has one or more mirrors which direct the laser beam to form the laser spot on the retina and an actuator that drives one or more of the mirrors so as to move the laser spot over an area of the retina (when the implant is inside the eye.) Control electronics is coupled to, and serves to control, the one or more actuated mirrors of the MEMS scanner and may also be coupled to control emissions by the laser (e.g., power and timing of laser pulses), based on a sequence of images received from the head unit 7. The images are received by a data receiver that may also be integrated in the implant 5 and that may be complementary to the data transmitter that in the head unit 7 (see FIG. 4.) In the wireless version, this reception may be made with the help of for example a radio frequency data antenna that is within or attached to the implant 5.

Power to operate the laser, MEMS scanner, and control electronics may be supplied by a wireless power supply which receives a wireless power signal via a charging antenna (that may be separate from the data antenna as shown in the figure), which power signal was transmitted over the air by the head unit 7 as described earlier, e.g., (e.g., optical, radio frequency or RF, infrared.) In one aspect, the wireless power supply may have some limited electrical energy storage capability to enable continuous or uninterrupted supply of power to the electronics in the implant 5, but no battery. In such a case, if the person were to remove the glasses from their head so that the wireless power signal is no longer received by the implant 5, then the laser projection subsystem would stop operating.

In one aspect, all of the elements of the implant 5 described above may be integrated into a single implant housing (see FIG. 3.) The implant 5 (and its housing) may be shaped to fit into a lens capsule of the eye, or into the anterior chamber of the eye, or into the vitreous humor of the eye.

In another aspect, the control electronics may be configured to control the MEMS scanner so as to move the laser spot by raster scanning or by Lissajous scanning. The control electronics may also modulate intensity of the laser beam, wherein the modulated intensity is synchronized with motion of a mirror in the MEMS scanner and with the image.

In another aspect, the camera in the head unit 7 could sample a larger field of view than the optical image that is painted on the retina (by the laser projection subsystem's MEMS scanner), so that only a subset of the full frame captured by the camera is transmitted to the implant 5. Alternatively, the full frame could be transmitted to the implant where processing logic in the implant may for example crop the full frame before painting the retina with a cropped image.

In yet another aspect, the laser includes two or more laser diodes and respective dichroic filters, which enables the image to be painted in multiple colors on the retina as each laser (laser diode) is tuned to a separate color and points to generally the same spot.

Figure 6:
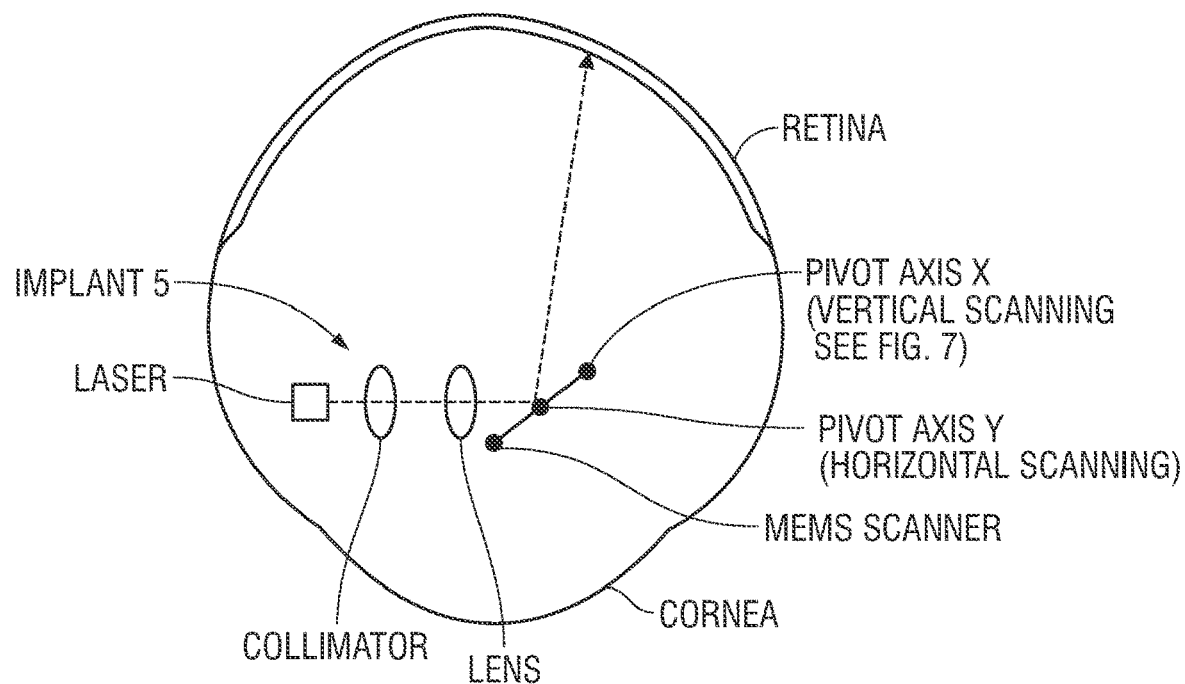
FIG. 6 is a top view illustration of generally horizontal scanning by the implant.
Figure 7:
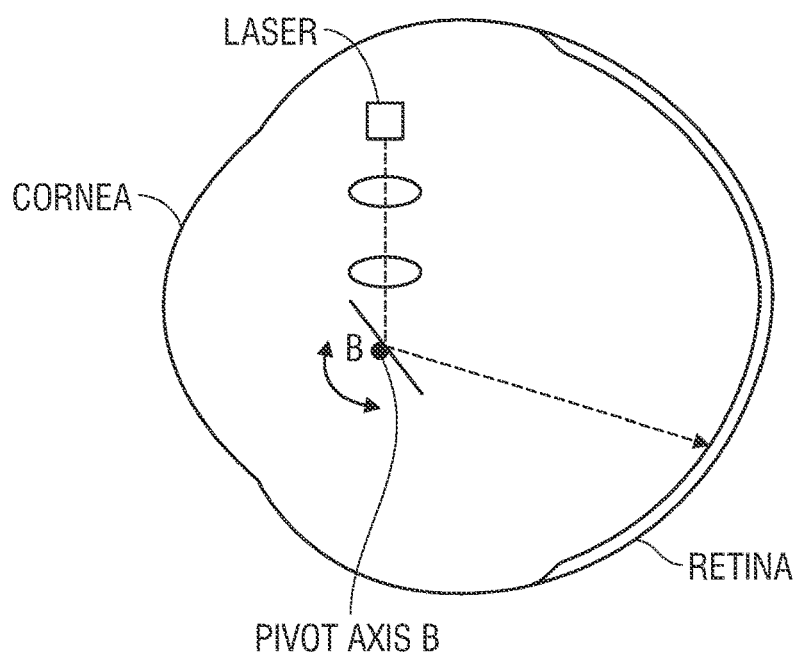
FIG. 7 is a side view illustration of generally vertical scanning by the implant.

In one aspect, the MEMS scanner may have one or two mirrors, e.g., a 2D scanning mirror, that directs the laser beam onto the retina, and are actuated so as to scan the retina by moving across the retina generally horizontally in one dimension and generally vertically in another dimension. FIG. 6 illustrates a top view of the eye where the laser spot is scanned generally horizontally when a mirror of the MEMS scanner pivots about the y-axis, while FIG. 7 illustrates a side view of the eye where the spot is scanned generally vertically when the mirror pivots about the x-axis.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For example, although in FIG. 6 and in FIG. 7 the implant is shown inside the vitreous humor, it could alternatively be configured to fit in the lens capsule as in FIG. 3, in the anterior chamber, or partially extend into the vitreous humor. The description is thus to be regarded as illustrative instead of limiting.

What is claimed is:

1. An intraocular laser projection system comprising:
    an implant, wherein the implant comprises:
        a laser configured to produce a laser beam;
        a collimator configured to collimate the laser beam;
        a lens configured to receive the laser beam from the collimator and configured to focus the laser beam into a laser spot on a retina of an eye when the implant is inside the eye; and
        a MEMS scanner configured to move the laser spot over an area of the retina when the implant is inside the eye.

2. The system of claim 1 wherein the implant further comprises:
    a wireless data receiver to wirelessly receive an image; and
    control electronics coupled to control the laser and the MEMS scanner based on the image.

3. The system of claim 1 wherein the laser comprises a plurality of laser diodes and respective dichroic filters.

4. The system of claim 1 wherein the implant comprises an implant housing having integrated therein the laser, the collimator, the lens, and the MEMS scanner.

5. The system of claim 4 wherein the implant is configured to be fit into a lens capsule, an anterior chamber, or a vitreous humor of the eye.

6. The system of claim 1 wherein the MEMS scanner is to move the laser spot by raster scanning or by Lissajous scanning.

7. The system of claim 1 wherein intensity of the laser beam is modulated to be synchronized with motion of a mirror in the MEMS scanner.

8. The system of claim 1 wherein the implant further comprises a charging antenna to receive a wireless power signal.

9. The system of claim 1 further comprising a head unit, wherein the head unit comprises:

a camera that captures an image, the camera being pointed to a direction of a gaze of a wearer of the head unit; and
a wireless data transmitter configured to wirelessly transmit the image.

10. The system of claim 1 wherein the implant is configured to be fit into a lens capsule of the eye.

11. The system of claim 1 wherein the implant is configured to be fit into an anterior chamber of the eye.

12. The system of claim 1 wherein the implant is configured to be fit into a vitreous humor of the eye.

13. An intraocular laser projection implant comprising:
a laser configured to produce a laser beam;
a collimator configured to collimate the laser beam;
a lens configured to focus the laser beam into a laser spot on a retina of an eye when the intraocular laser projection implant is inside the eye; and
a MEMS scanner configured to move the laser spot over an area of the retina when the intraocular laser projection implant is inside the eye;
a wireless data receiver configured to wirelessly receive an image; and
control electronics coupled to control the laser and the MEMS scanner based on the image.

14. The intraocular laser projection implant of claim 13 further comprising an implant housing having integrated therein the laser, the collimator, the lens, the MEMS scanner, the wireless data receiver, and the control electronics.

15. The intraocular laser projection implant of claim 13 wherein the MEMS scanner is configured to move the laser spot by raster scanning or by Lissajous scanning.

16. The intraocular laser projection implant of claim 13 wherein the control electronics are configured to modulate intensity of the laser beam, wherein the modulated intensity is synchronized with motion of a mirror in the MEMS scanner and with the image.

17. An intraocular laser projection system comprising:
an implant, wherein the implant comprises:
a laser configured to produce a laser beam;
a collimator configured to collimate the laser beam;
a lens configured to focus the laser beam into a laser spot on a retina of an eye when the implant is inside the eye; and
a MEMS scanner configured to move the laser spot over an area of the retina when the implant is inside the eye; and
a head unit, wherein the head unit comprises:
a camera that captures an image, the camera being pointed to a direction of a gaze of a wearer of the head unit; and
a wireless data transmitter configured to wirelessly transmit the image.

18. The system of claim 17 wherein the implant further comprises a charging antenna configured to receive a wireless power signal transmitted by the head unit.

19. The system of claim 18 wherein the implant is shaped to fit into a lens capsule of the eye.

20. The system of claim 18 wherein the implant is shaped to fit into an anterior chamber of the eye.

* * * * *